(12) United States Patent
Kumar

(10) Patent No.: US 7,293,255 B2
(45) Date of Patent: Nov. 6, 2007

(54) APPARATUS AND METHOD FOR AUTOMATED CREATION OF RESOURCE TYPES

(75) Inventor: Naveen Kumar, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 469 days.

(21) Appl. No.: 09/822,164

(22) Filed: Mar. 30, 2001

(65) Prior Publication Data

US 2002/0174420 A1 Nov. 21, 2002

(51) Int. Cl.
G06F 9/44 (2006.01)
G06F 9/445 (2006.01)
G06F 11/00 (2006.01)

(52) U.S. Cl. .......................... 717/109; 717/176; 714/4

(58) Field of Classification Search ........ 717/106–109, 717/110–113, 176; 714/4
See application file for complete search history.

(56) References Cited

U.S. PATENT DOCUMENTS

| | | | | |
|---|---|---|---|---|
| 5,159,687 A | * | 10/1992 | Richburg | ................... 717/106 |
| 5,247,683 A | * | 9/1993 | Holmes et al. | ............. 709/221 |
| 5,287,511 A | * | 2/1994 | Robinson et al. | ........... 717/106 |
| 5,822,531 A | * | 10/1998 | Gorczyca et al. | ........... 709/221 |
| 5,875,290 A | * | 2/1999 | Bartfai et al. | ................. 714/13 |
| 5,918,017 A | * | 6/1999 | Attanasio et al. | ........... 709/224 |
| 5,961,650 A | * | 10/1999 | Arendt et al. | ................... 714/2 |
| 5,964,886 A | * | 10/1999 | Slaughter et al. | ............. 714/4 |
| 5,996,086 A | * | 11/1999 | Delaney et al. | ................. 714/4 |
| 6,038,677 A | * | 3/2000 | Lawlor et al. | ................. 714/4 |
| 6,134,673 A | * | 10/2000 | Chrabaszcz | ................... 714/13 |
| 6,314,526 B1 | * | 11/2001 | Arendt et al. | ................... 714/4 |

OTHER PUBLICATIONS

Armando Fox, Steven D. Gribble, Yatin Chawathe, Eric A. Brewer, Paul Gauthier, "Cluster-based scalable network services", Oct. 1997, Proceedings of the 16th ACM symposium on Operating systems principles, vol. 31 Issue 5, pp. 78-91.*
Vogels et al., "The Design and Architecture of the Microsoft Cluster Service—A Practical Approach to High-Availability and Scalability", Jun. 1998, Proceedings of the The Twenty-Eighth Annual International Symposium on Fault-Tolerant Computing.*
Y. A. Khalidi, J. M. Bernabeu, V. Matena, K. Shirriff, and M. Thadani, "Solaris MC: A MultiComputer OS", Jan. 1996, Proceedings of the USENIX 1996 Annual Technical Conference, pp. 191-204.*

(Continued)

Primary Examiner—Tuan Dam
Assistant Examiner—Derek J. Rutten
(74) Attorney, Agent, or Firm—Park, Vaughan & Fleming LLP

(57) ABSTRACT

Apparatus and method for automatically generating resource types for installation on nodes of a clustered computer system. The wizard provides a user interface for inputting user specified parameters relating to the configuration of the clustered computer system and the application. Based on the input information, the wizard automatically generates resource types that start, stop and monitor execution of the application on nodes of clustered computer system. The generated resource types can be provided as a software package for easy installation on nodes of the clustered computer system.

30 Claims, 4 Drawing Sheets

OTHER PUBLICATIONS

Phil Lewis, "A High-Availability Cluster for Linux", Aug. 1999, Linux Journal, vol. 1999, Issue 64es, Article No. 25, ISSN:1075-3583.*

"Application Packaging Developer's Guide", Aug. 1997, Sun Microsystems, Inc. Document No. 802-5892-10, Chapter 1.*

"Sun Cluster 2.2 Software Installation Guide", Apr. 1999, Sun Microsystems, Inc., Document No. 806-1008, Chapter 1.*

"Sun Cluster 2.2 API Developer's Guide", Mar. 1999, Sun Microsystems, Inc., Document No. 806-1006.*

"Developing Agents for Applications Running on Sun Cluster Software", 2001, Sun Microsystems, Inc., Whitepaper, Online at <http://wwws.sun.com/software/whitepapers/wp-clusterapi/>.*

"System Administration Guide, vol. 1", Oct. 1998, Sun Microsystems, Chapter 6, pp. 107-120.*

Sun Cluster 3.0 System Administration Guide (30 pages, printed on Mar. 29, 2001). http://docs.sun.com:80/ab2/coll.572.7/CLUSTSYSADMIN/@Ab2PageView/479?DwebQuery =scrgadm&oqt=scrgadm&Ab2Lang=C&Ab2Enc=iso-8859-1, Chapters 1 and 6.

Sun Cluster 3.0 Concepts (12 pages, printed on Mar. 29, 2001). http://docs.sun.com:80/ab2/coll.572.7/CLUSTCONCEPTS/@Ab2PageView/451?DwebQuery =scrgadm&oqt=scrgadm&Ab2Lang=C&Ab2Enc=iso-8859-1, Chapter 1.

* cited by examiner

APPARATUS AND METHOD FOR AUTOMATED CREATION OF RESOURCE TYPES

FIELD

The present invention relates to techniques for building and managing clustered computer systems. More specifically, the present invention relates to automatic generation of scalable and/or highly available resource types to be installed on multiple nodes of a clustered computer system. The invention also relates to providing a user interface for customizing the generated resource types.

BACKGROUND

The usage of the Internet has increased dramatically over the last several years. Many popular websites receive millions of "hits" each day. Consequently, the network servers providing content for these websites have experienced a dramatic increase in their workload. In order to process such substantial amounts of network traffic without subjecting clients (surfers) to annoying delays in retrieving web pages, it is advantageous to distribute the applications (or services) handling this traffic among multiple web server hardware nodes, so that the multiple server nodes can operate in parallel to process the network traffic.

A cluster is a collection of coupled computing nodes that provides a single client view of network services or applications, including databases, web services, and file services. In other words, from the client's point of view, a multinode computer cluster operates to provide network services in exactly the same manner as a single server node. Each cluster node is a standalone server that runs its own processes. These processes can communicate with one another to form what looks like (to a network client) a single system that cooperatively provides applications, system resources, and data to users.

A cluster offers several advantages over traditional single server systems. These advantages include support for highly available and scalable applications, capacity for modular growth, and low entry price compared to traditional hardware fault-tolerant systems.

A service that spreads an application across multiple nodes to create a single, logical service is called a scalable service. Scalable services leverage the number of nodes and processors in the entire cluster on which they run. One node, called the Global Interface Node or GIF node, receives all application requests and dispatches them to multiple nodes on which the application server is running. If this node fails, the global interface fails over to a surviving node. If any of the nodes on which the application is running fails, the application continues to run on the other nodes with some performance degradation until the failed node returns to the cluster.

If any of the aforementioned network server nodes fails, it is desirable that other nodes take over the services provided by the failed node such that the entire system remains operational. High Availability (HA) is the ability of a cluster to keep an application up and running, even though a failure has occurred that would normally make a server system unavailable. Therefore, highly available systems provide nearly continuous access to data and applications.

It is well known in the art that an application, such as a web server, needs to be specially configured to be able to run as a highly-available or scalable application on a computer cluster. Specifically, there must be provided a special program called resource type, that would start an instance of the application, monitor application's execution, detect failure of the application and start another instance of the application if the first instance fails. The term data service will be used herein to describe a third-party application such as Apache web server that has been configured to run on a cluster rather than on a single server. A data service includes the application software and special additional container process called resource type that starts, stops, and monitors the application.

One example of the aforementioned resource type is a failover resource type, which is the process by which the cluster automatically relocates an application from a failed primary node to a designated secondary node. Failover services utilize the aforementioned fail over resource type. In other words, failover resource type is a container for application instance resources.

For failover data services, application instances run only on a single node. If the fault monitor detects an error, it either attempts to restart the instance on the same node, or to start the instance on another node (failover), depending on how the data service has been configured. With failover, a clustered computer system provides high availability.

When a failover occurs, clients might see a brief interruption in service and might need to reconnect after the failover has finished. However, clients are not aware of the physical server from which they are provided the application and data.

Another example of a data service is a scalable data service. The scalable data service has the potential for running active instances of an application on multiple cluster nodes. Scalable services utilize a scalable resource type to start, stop, and monitor the application. The scalable resource group can be online on multiple nodes, so multiple instances of the service can be running at once.

Service requests come into the cluster through a single network interface (the global interface or GIF) and are distributed to the nodes based on one of several predefined algorithms set by the load-balancing policy. The aforementioned load-balancing policy is a set of rules describing how the network traffic should be distributed among nodes of a clustered computer system. The cluster can use the load-balancing policy to balance the service load between several nodes. Note that there can be multiple GIFs on different nodes hosting other shared addresses.

For scalable services, application instances run on several nodes simultaneously. If the node that hosts the global interface fails, the global interface fails over to another node. If an application instance running fails, the instance attempts to restart on the same node.

If an application instance cannot be restarted on the same node, and another unused node is configured to run the service, the service fails over to the unused node. Otherwise, it continues to run on the remaining nodes, possibly causing a degradation of service throughput.

In a conventional highly available system the implementation of resource types, such as failover resource type or scalable resource type, are created manually by a developer for each highly available application. Unfortunately, creating appropriate resource types manually requires significant amounts of time and effort, and therefore, it is time consuming and expensive.

Accordingly, it would be highly advantageous to have a tool that would automate the process of creation of the aforementioned resource types based on characteristics of a particular clustered computer system and parameters specified by the user. It would also be advantageous to have a tool that would generate utility scripts for starting, stopping and removing an instance of the resultant resource type.

SUMMARY

To overcome the limitations described above, and to overcome other limitations that will become apparent upon reading and understanding the present specification, apparatus and methods are disclosed that automatically generate resource types for installation on nodes of the clustered computer system. A tool embodying the disclosed inventive techniques will hereinafter be referred to as the "inventive wizard tool", "inventive wizard", or simply "inventive tool".

One aspect of the invention is a method for automatic generation of a resource type for an application. Another aspect of the invention is a computer readable medium embodying a program for automatic generation of a resource type for an application. Yet another aspect of the invention is an apparatus configured for automatic generation of a resource type for an application. The generated resource type is installed on one or more nodes of a clustered computer system.

According to the inventive technique, certain user specified characteristics of the application and the clustered computer system are input using a user interface. Based on the input characteristics, a code for at least one resource type is generated. This code, along with the application are installed on at least one node of the clustered computer system.

The application can be a highly available application or a scalable application. The generated resource type can start execution of the application; stop execution of the application; or monitor execution of the application. The code of the resource type generated by the inventive wizard can be a source code. This generated code can be arranged into a software package, such as Unix package, prior to installation on nodes of the clustered computer system. The aforementioned user-specified characteristics can be input using a graphical user interface.

DESCRIPTION OF THE DRAWINGS

Various embodiments of the inventive wizard tool will now be described in detail by way of example only, and not by way of limitation, with reference to the attached drawings wherein identical or similar elements are designated with like numerals.

DETAILED DESCRIPTION

One or more embodiments of the inventive wizard will now be described in detail with reference to the attached drawings, wherein like numbers represent the same or similar elements. While the following description is in terms of an exemplary mode for achieving one or more objectives of the invention, it will be undoubtedly appreciated by those skilled in the art that many variations may be accomplished in view of those teachings without deviating from the spirit or scope of the described embodiments.

Figure 1:
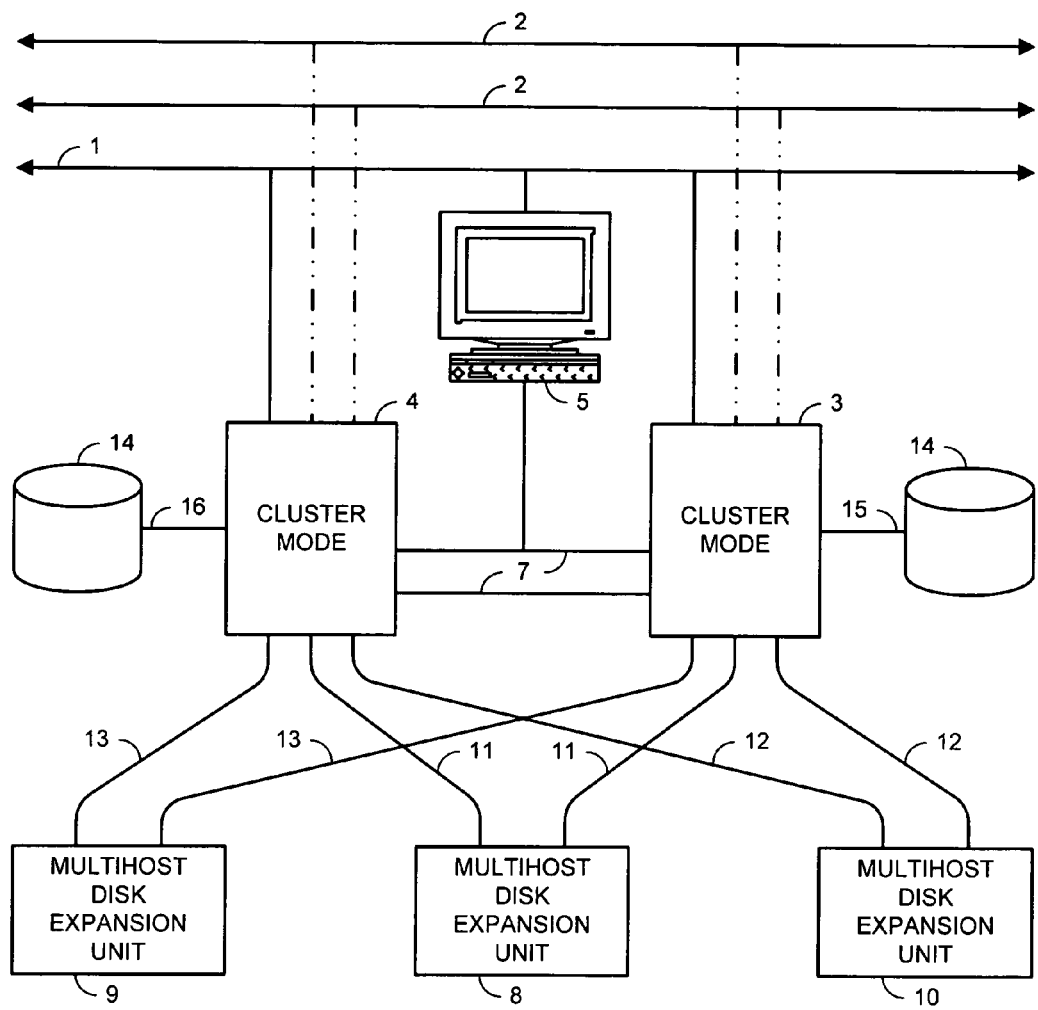
FIG. 1 illustrates an exemplary hardware configuration of a clustered computer system.

FIG. 1. illustrates an exemplary hardware configuration of a clustered computer system. In this figure, the clustered computer system comprises nodes 3 and 4 providing services to clients through public network 1, such as the Internet. The system configuration may also include optional second public network 2. In addition to depicted cluster nodes 3 and 4, additional cluster nodes are possible. Disk drives 14 connected to the cluster nodes 3 and 4, using interconnects 15 and 16 respectively, provide local data storage to each of the computer cluster nodes 3 and 4. The nodes 3 and 4 can be additionally interconnected connected through high-speed private networks 7. Multihost disk expansion units 8, 9 and 10 can be used by all the nodes in the cluster to store shared data. These units 8-10 are connected to the computer nodes 3 and 4 using fast interconnects 11-13. The operation of the cluster can be controlled from a administrator's workstation 5, which can access the cluster nodes through the public network 1 and 2 or private network 7.

The inventive resource type wizard tool automates the creation of resource types to be executed on the nodes of a clustered computer system.

The inventive tool significantly reduces the time required to develop the highly available and scalable data services, while simultaneously giving the user the flexibility of fine-tuning the parameters of these services, if necessary. The resultant highly-available applications, running on nodes of a clustered computer system are able to survive the failures of underlying software or hardware, with only a brief interruption of service. On the other hand, the scalable data services generated using the inventive tool are able to increase the performance of the application, by means of executing multiple instances of the application on multiple nodes of the cluster.

Figure 2:
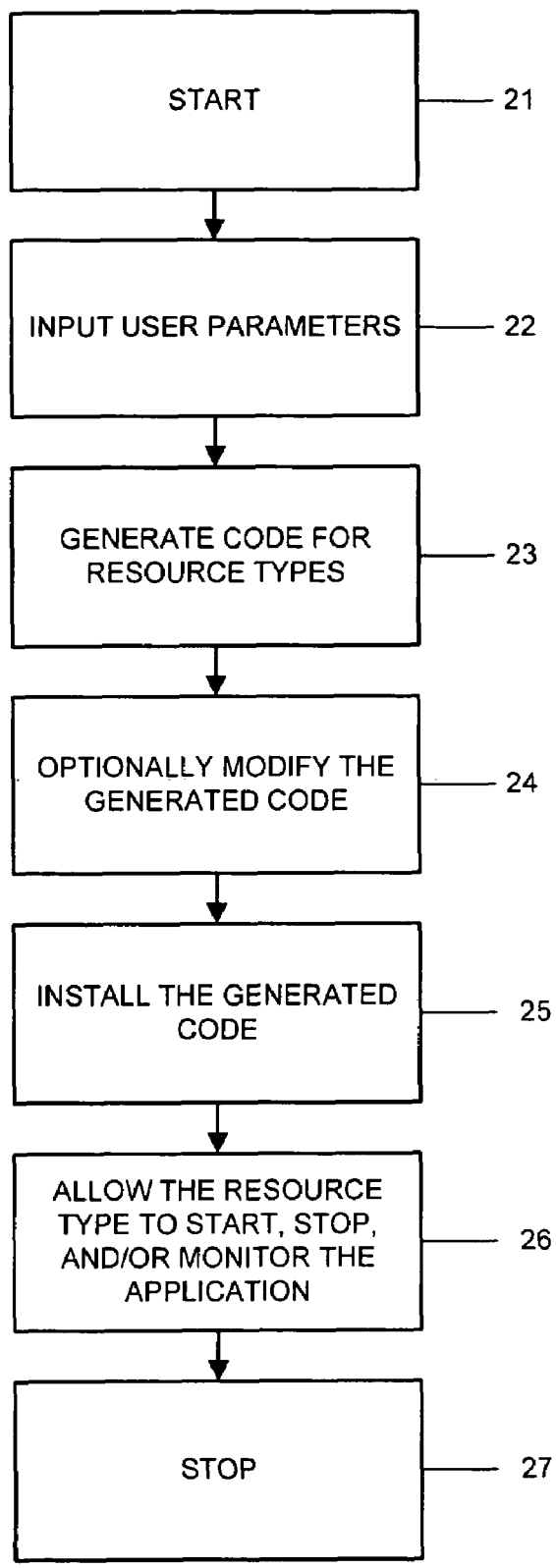
FIG. 2 provides a flow diagram illustrating operation of the inventive resource type wizard.

FIG. 2 provides a block diagram illustrating operation of the inventive resource type wizard. Upon the beginning of execution, at block 21, the inventive resource type wizard requests the user to input certain information in block 22, which is used to generate a set of source code files based on the input provided by the user (see block 23). In one embodiment of the invention, the user has the option of having the source code for the resource type generated in C, Ksh or perl. C is a programming language well known to persons of skill in the art. Ksh and perl are script programming languages also well known to persons skilled in the art. The aforementioned ksh format is more useful in case the user does not have access to a C compiler or if the user is more comfortable with ksh source code. However, for the ease of extensibility and the richness of underlying functionality, it is preferable to select C as the type of the generated source code. In addition, resource types with ksh source code do not support non-network aware applications or applications with multiple process trees. The inventive wizard tool also generates and customizes the resource type registration (RTR) file. At block 24, the user has the ability to modify the generated code. Note that the user can return to block 24 at any time after the code for the resource type has been generated. The generated resource code is installed on nodes of the clustered computer system in block 25. The user is allowed to start, stop, and monitor the application at block 26. The operation of the inventive wizard terminates in block 27.

In addition to the aforementioned resource types, the inventive wizard generates customized utility scripts for starting, stopping and removing an instance (also known as resource) of the target resource type. The start script takes care of registering the resource type, and creating the necessary resource groups and resources. It also creates the network resources (such as LogicalHostname or SharedAddress) to be used by the application to communicate with the clients over the network. The stop script stops and disables the instance of the resource. The remove script undoes everything done by the start script previously—it stops and removes the resources, resource groups and the target resource type from the system.

In one embodiment, the inventive wizard packages all generated code into an installable package which can then be installed on all nodes of the computer cluster. In another embodiment of the invention, the code is packaged into a Unix software package. The structure and the manner of implementing a Unix software package is well known in persons of skill in the art.

In an embodiment of the invention, the resource type wizard supports both network aware as well as non-network aware (or stand-alone) applications. The network aware application is an application that utilizes network in its operation. The non-network aware application does not utilize network connection. Applications of both types are well known to persons skilled in the art.

Using the inventive wizard, each type of application can be wrapped either in the aforementioned failover or scalable resource type. The inventive wizard may also support applications having more than one independent process tree that need to be monitored, and restarted, by a process monitoring facility (PMF) individually. The manner of creation of such resource types, is described in detail below.

It is important to note that there are certain prerequisites for an application to be made HA or scalable. Therefore, each application needs to be analyzed individually to decide whether it's capable of being made highly available and/or scalable. This analysis needs to be done by the user before using the inventive wizard.

Creation of the resource types using the inventive wizard is a process consisting of one or more of the following two steps, wherein the exact order of the steps or their substeps is not critical to the invention:

In the first step the user is asked to input some basic information about the resource type to be generated. The input information may include, among other parameters, one or more of the following:
the resource type name
the vendor id: this would typically be the stock symbol of the vendor or some other identifier that uniquely identifies the vendor. This field is initialized to SUNW (Sun™'s stock symbol on NASDAQ™). Sun™ is a registered trademark of SUN Microsystems. Inc. of Santa Clara, Calif. NASDAQ™ is a registered trademark of NASDAQ Stock Market. Inc.
installation directory: the user specifies a directory under which the wizard will create a subdirectory formed, for example, by the concatenation of the vendor_id and the resource_type_name. For example, if vendor_id is SUNW and resource_type_name is "ftp", then the wizard will create a subdirectory SUNWftp under the installation directory specified by the user. SUNWftp will then contain everything that's generated for the target resource type. The wizard also generates a .rtconfig file to keep track of, and to reuse, the user supplied input. The installation directory is initialized to the directory from where the wizard is started.
failover of scalable: the user chooses whether the target resource type is failover or scalable.

network aware: the user specifies whether the base application is network aware, i.e. if it uses the network to communicate with its clients.
C or ksh: the user selects the language in which the source code is to be generated.

In addition to, or alternatively to the first step, in the second step, the user may be asked to input various configuration parameters for the target resource type. This may include one or more of the following:
start command: This the full command line that can be passed to any unix shell to start the application. The complete command line may include all parameters needed to start the application, such as hostnames, port numbers path to configuration files etc. The completed command line may be placed in quotes.
stop command: this optional input specifies the command to be run to stop the base application. If this input is omitted, the generated code uses signals to stop the base application.
probe command: this optional input specifies a command that can periodically be invoked to do a health check on the application and return appropriate exit status (zero for success and non zero for failure). This command would typically be a simple client of the base application. If this input is omitted, the generated code simply connects and disconnects to the port specified and, if that succeeds, declares the application healthy. The probe command can only be used with network aware applications and is disabled for non-network aware applications.
timeouts: this field may include the timeouts for the start, stop and probe commands. In an embodiment of the invention these timeouts are initialized to 300, 300 and 30 seconds respectively.

According to one embodiment of the inventive wizard, there is provided a command line version of the inventive resource type wizard, which incorporates the same two step process with different commands to be run at each step. Specifically, the aforementioned embodiment can be used to create a template for a resource type that uses a Resource Group Manager (RGM) framework to make itself highly available and/or scalable. The aforementioned Resource Group Manager is a software facility used to make cluster resources highly available and scalable by automatically starting and stopping these resources on selected cluster nodes. This embodiment of the inventive wizard tool can be used to create resource type templates for both network-aware as well as non-network-aware applications. Moreover, each kind of application (whether network aware or not) can be made failover or scalable.

The property of the resource type being failover or scalable is orthogonal to its network-awareness. In other words, each of failover or scalable resources can be either network-aware or not network-aware. The present embodiment creates a directory of the for each created resource type, for example <${vendor_id}${resource_type_name}> under, for example, the Install_directory. This directory can contain everything related to the generated source and, subsequently, binary and package files, for the resource type. The present embodiment also creates a .rtconfig file to store the user-supplied configuration information for the resource type. Further, the present embodiment lets the user create one resource type per directory and different resource types can be created in different directories.

The inventive wizard permits the use of certain variables in Start, Stop and Probe command lines whose value will be substituted at runtime (i.e. when run on the cluster). This feature of the invention enables the user to tie these commands to the data which is cluster specific, or configuration dependent. One such example is the hostname (or IP address) on which the application will be listening and serving client requests. It is not possible to determine this value upfront, at the time of creating the resource type through the wizard. However, many applications require the value of hostnames to be specified on the command line.

This is achieved by specifying these variables on the command line in the $var_name format. For example, to start the echo_server the hostname may be specified on the command line. This can be done in the following manner:

/opt/SUNWscrtw/demo/network_aware/echo_server-p<port_no>-l $hostnames

Note the use of $hostnames in the echo_server command line. hostnames is a Wizard defined variable whose value will be substituted with the LogicalHostname or SharedAddress hostname (essentially an IP address) as configured in the Network_resources_used resource property of the resource or this resource type. In case more than one hostnames are configured in the Network_resources_used property, the value of the hostnames variable will contain all of them separated by commas (,). If additional parsing is required in such a case, that may be done in a wrapper script.

The hostnames variable is one of the variables supported by the inventive wizard. In another embodiment of the inventive wizard, along with the support for adding new extension properties, as explained in detail below, those properties are also made available in the Start, Stop and Probe command line in the form of wizard defined variables. The aforementioned variables may then be accessed in a similar fashion as hostnames, i.e. using $var_name.

Optionally, the aforementioned two step resource type creation process of an embodiment of the inventive wizard may be restartable. In other words, it's possible to quit after filling in information in the step one (and executing it), and then restart the wizard and fill in the rest of the information in step two later. In order to accomplish this, the wizard may be restarted from the same directory where it was run originally. Or, alternatively, the installation directory field can be selected to point to the original directory.

On startup, the inventive wizard may look for the existence of the .rtconfig file and initializes all the fields based on the inputs given previously. Similarly, every time the installation directory is changed, the wizard may look for the existence of the .rtconfig file in that directory and initialize as many fields as possible. Optionally, the input fields are left unaffected if the .rtconfig file is not found in the new installation directory.

Leveraging the capabilities described in detail below, it may be possible to reuse the information previously entered for some other resource type to generate a new resource type. This can be achieved by running the wizard from the same directory where the previous resource type was created. This will result in the wizard reading in all the information from the previous resource type and initializing the input fields with them. The user can then change the installation directory to some other directory and make any modifications to the values read from the .rtconfig file, before generating the new resource type.

This feature is useful in the following circumstances. Suppose the user starts by prototyping a simple failover application and doesn't yet have a C compiler. Therefore, the user selects ksh as the type of the source code generated for the resource type. However, overtime, the user may find ksh to be the limiting factor in meeting growing needs of the data service. The user may also find that the source code generated in C is more powerful and lets the user access a richer set of APIs. If the user does not want to have to recreate the data service (which the user has previously created in ksh) from scratch in C, the user can follow the procedure described above to clone the data service, this time in C.

The inventive resource type wizard takes as input a handful of important parameters about the target resource type and generates source code and the resource type registration (RTR) file based on that input. To keep the resource type generation process simple, the input taken by the wizard is not meant to be exhaustive. Therefore, to add more sophisticated features (e.g. validation checks for additional properties), or to tune parameters not exposed by the wizard, one needs to make changes to the generated source code and/or RTR file. The wizard, in addition to generating the source files and the RTR file, also generates the makefile with appropriate targets which can then be used to recompile the source code and regenerate the resource type package. The wizard also gives the user pointers to potential places where data service specific code might be added. These places are marked in the generated source code by the comments of the form:

/* Insert your data service specific code here */.

As it has been described in detail above, the inventive wizard creates a "root" directory based, for example, on the vendor_id and the resource_type_name, which is used to house everything related to the target resource type generated.

The source files generated by the wizard, based on user input, can be, for example, under the src subdirectory under this "root" directory. The binary files generated by compiling these C source files can be under the bin subdirectory of the same root directory. In the case of ksh these files are identical to the ones under the src subdirectory.

The until subdirectory may contain the utility scripts which can be used to start, stop and remove an instance of the target resource type. The pkg subdirectory is where the final installable package is created. The docs subdirectory may contain customized pseudo text man pages for the three utility scripts. The etc subdirectory contains the RTR file. The RTR file is of the form ${VENDOR_ID}.${RT_NAME), i.e. if the vendor_id is SUNW and the resource_type_name is ftp, then the RTR file is named SUNW.ftp. Persons of skill in the art will readily appreciate that the aforementioned directory structure is described by way of example only and not by way of limitation.

If the user makes any changes to the source code, the user can recompile the source files using the following command:
% make In the case of ksh source files, this operation reduces to simply copying the updated source files in the bin directory.

After compiling the resource type source code, the package for the resource type can be regenerated using:
% make pkg The older copy of the package in the pkg subdirectory will be overwritten as a result of the previous command.

If the user wants to make changes only to the RTR file, then he only needs to do the second step, i.e. package creation.

Creating resource types for two exemplary applications using the inventive wizard will now be explained in detail.

Network Aware: A first exemplary application is a simple network aware application that listens on a specified hostname and port number. The following is the usage message from echo_server:

Usage: echo_server [-p<port>] [-l<bind address>] [-f<logfile>] [-h]
Arguments:
-l Address to bind to (defaults to none)
-p Port to listen to (defaults to 5000)
-f Logfile to write to (defaults to none)
-h Display usage A client for the echo_server is application called echo_client. The following is the usage message from echo_client:

Usage: echo_client -l<address> [-p<port>] [-n<iterations>] [-i<interval>] [-h]
Arguments:
-l Address to connect to
-p Port to connect to (defaults to 5000)
-n Number of times to connect to the server (defaults to a continuous loop)
-i Time interval in seconds between connections (defaults to 0)
-h Display usage Upon successful connection to the echo_server, the echo_client prints out, for example, the date and time and seq_id of the packet sent, and the (physical) hostname of the server. The latter is useful, for example, to demonstrate the load balancing for scalable applications.

Non Network Aware: The second application is an exemplary non-network aware application. It is a simple script, called print_host, that prints to a system log file, every 5 seconds, the name of the physical host on which it's running along with the date and time. Because it does not use any network connectivity to perform its job, it's an ideal candidate to demonstrate the capabilities of the inventive wizard relative to the non-network aware applications.

The following may be used as the exemplary commands for creating the resource type for print_host:

| Start Command | /bin/print_host |
|---|---|
| Stop Command | Should be left blank. Signals will be used to stop the application. |
| Probe Command | Being a non-network aware application, it can not have a probe command. |

Once the package for the demo resource type has been created, the resultant package should be added to all nodes in the cluster. Then, from any one node in the cluster, the user may run the start utility command, with appropriate arguments, to run the application under the control of the RGM.

A script preremove of the exemplary package generated for the target resource type cleans up the cluster by looking for any resources/resource groups that may have been generated, and not removed, by a previous run of the start command. This operation involves running the scrgadm (1M) and scswitch (1M) commands to offline and remove the resources/resource groups. The first aforementioned command scrgadm(1M) manages the registration of resource types, the creation of resource groups, and the activation of resources within a resource group. This command can also be used to display information on installed resources, resource groups and resource types. The second aforementioned command scswitch performs changes affecting node mastering configuration and states for resource groups and disk device groups. Because the aforementioned commands are designed to be run from only one node of the cluster at a time, if the pkgrm of the target resource type is attempted from more than one node simultaneously, the inventive preremove command will fail on some or all the remaining nodes. This problem can be avoided in a number of different ways:

By first running the remove script (from one node of the cluster) before attempting the pkgrm from any node. The aforementioned pkgrm command affects removal of a Unix software package.

By doing the pkgrm first from one node of the cluster, which will take care of all the necessary cleanup, and then doing the pkgrm from the remaining nodes, simultaneously.

If the pkgrm does fail, because the user happened to run pkgrm simultaneously from more than one node, without having run the remove script first, the user can attempt the pkgrm again first from one node, as suggested above, and then from the remaining nodes.

The inventive resource type wizard can be used to create resource types for applications that have more than one independent process tree. The term "independent process trees" will be used herein with reference to process trees which are monitored and restarted individually. In order to achieve this, each application can be started with its own tag.

To create the resource type for an application having more than one process tree, the user needs to create a text file. Each line in the aforementioned text file should specify a command starting different process trees. This text file should then be specified in the "Start Command" text field in the configure screen illustrated in FIG. 3. Furthermore, the user needs to make sure that the text file does not have execute permissions. This enables the wizard to distinguish between a simple executable script containing multiple commands, as opposed to a text file containing commands to start different process trees. Note that if the created text file (having commands to start multiple process trees) does have execute permissions, the resource type (actually its resources) would come up fine with the caveat that all the commands will be started under one process group precluding the possibility of their being monitored and restarted.

While the invention has been described herein with reference to preferred embodiments thereof, it will be readily understood by persons of skill in the art that numerous modifications in form and detail can be made with respect thereto without departing from the spirit and scope of the invention, as defined in and by the appended claims.

Figure 3:
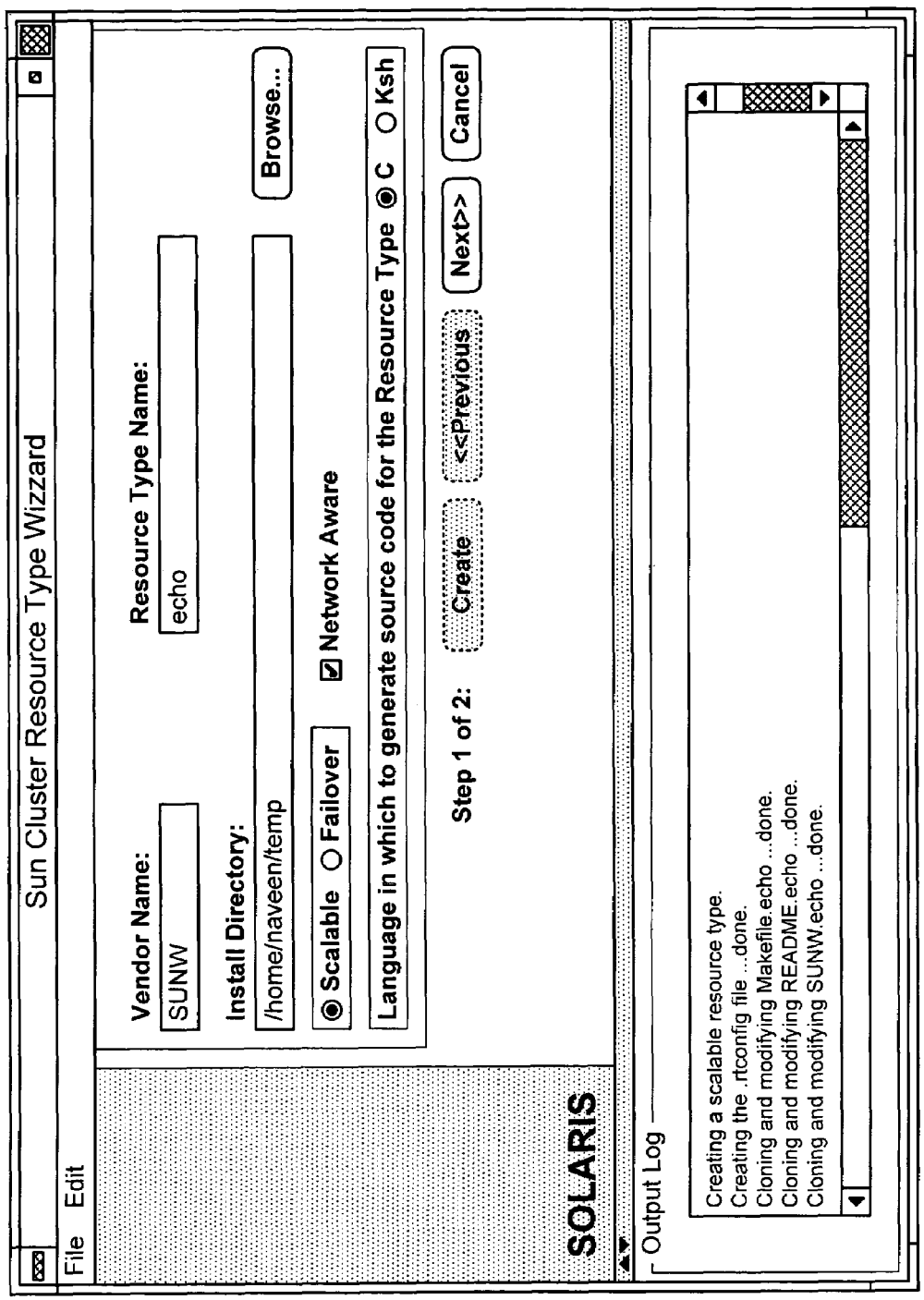
FIG. 3 provides an exemplary snapshot of the create screen of the inventive wizard.
Figure 4:
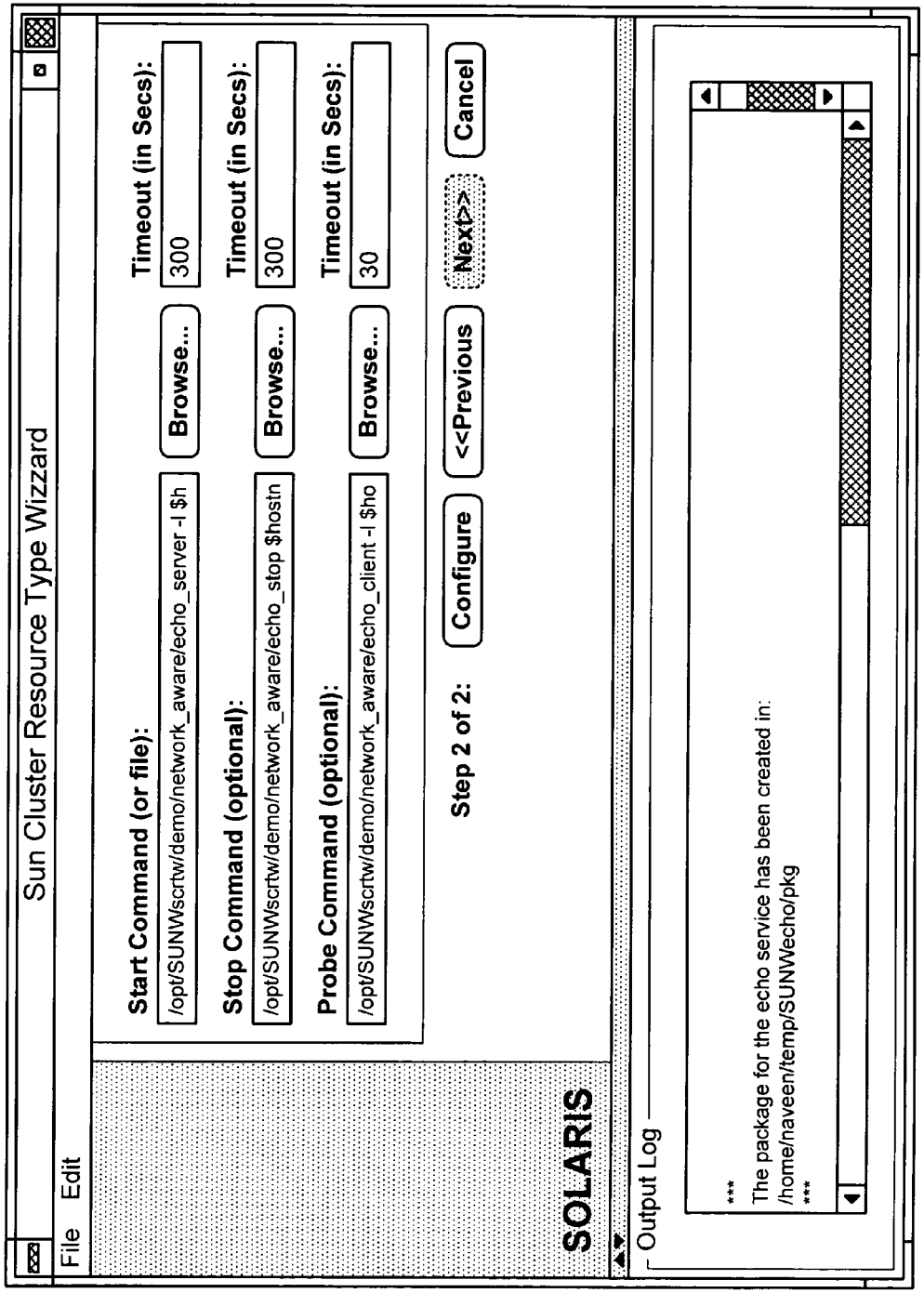
FIG. 4 provides an exemplary snapshot of the configure screen of the inventive wizard.

For example, the user can manually edit the properties contained in the resource type registration file, which were not specified using the configure screen shown in FIG. 3. It is also possible to provide a GUI based tool permitting the users to edit the properties in the resource type registration file and also do sufficient upfront checking to ensure that the values supplied are correct and consistent.

Persons of skill in the art will also readily appreciate that a GUI based tool can be provided to automate manual adding of new extension properties to the resource type registration file. Finally, it is also possible to generate the source code for the resource type in perl. Perl is a programming script language well known to persons of skill in the art.

Persons of skill in the art will appreciate that the present invention can be implemented as a computer program embodied in a tangible medium, such as a floppy disc, a CDROM, an optical disk, a computer hard drive, and the like. The present invention can also be implemented as a computer system having at least a memory storing a computer program embodying the inventive technique and a central processing unit (CPU) executing the aforementioned program.

The invention claimed is:

1. A method for automatic generation of a resource type for an application, said resource type to be installed on one or more nodes of a clustered computer system, said method comprising:
 a. accepting user specified characteristics of said application and said clustered computer system, wherein said application has multiple independent process trees;
 b. determining if said application can be wrapped in said resource type;
 c. receiving a user-supplied selection of a programming language;
 d. automatically generating a code in the user-supplied selected programming language for at least one resource type based on at least one of said input user specified characteristics;
 e. creating a file specifying, for each process tree of the multiple independent process trees, a command to start each process tree of the multiple process trees;
 f. wrapping said application in the at least one resource type;
 g. installing said generated code of said at least one resource type and said application on at least one node of said clustered computer system;
 h. automatically generating a configuration file separate from the code, wherein the configuration file stores user-supplied configuration information which allows the generated code to be configured after it is installed, and wherein the user-supplied information includes at least one of a resource type name, a vendor ID, an indication of whether the resource type is failover or scalable, an indication of whether the base application is network aware, and a selected language for the generated code; and
 i. automatically generating customized utility scripts, wherein the customized utility scripts enable starting, stopping, and removing an instance of the resource type on at least one node of said clustered computer system.

2. The method of claim 1, wherein said application is a highly available application.

3. The method of claim 1, wherein said application is a scalable application.

4. The method of claim 1, wherein said resource type performs at least one of the following:
 a. starts execution of said application;
 b. stops execution of said application; and
 c. monitors execution of said application.

5. The method of claim 1, wherein said code of said at least one resource type is a source code.

6. The method of claim 1, wherein before said installing of said generated code, said generated code of said resource type and said application are arranged into a software package.

7. The method of claim 1, wherein said user specified characteristics comprise information on whether said resource type is failover or scalable.

8. The method of claim 1, wherein said user specified characteristics comprise information on whether said application is network-aware or non network-aware.

9. The method of claim 1, wherein said user specified characteristics are entered at a user interface, wherein said user interface is a graphical user interface.

10. The method of claim 1, wherein said generating of said code further comprises providing said user with an ability to modify said generated code.

11. A computer readable medium containing a program for automatic generation of a resource type for an application, said resource type to be installed on one or more nodes of a clustered computer system, said program comprising:
 a. accepting user specified characteristics of said application and said clustered computer system using a user interface, wherein said application has multiple independent process trees;
 b. determining if said application can be wrapped in said resource type;
 c. receiving a user-supplied selection of a programming language;
 d. automatically generating a code in the user-supplied selected programming language for at least one resource type based at least on said input user specified characteristics;
 e. creating a file specifying, for each process tree of the multiple independent process trees, a command to start each process tree of the multiple process trees;
 f. wrapping said application in the at least one resource type;
 g. installing said generated code of said at least one resource type and said application on at least one node of said clustered computer system;
 h. automatically generating a configuration file separate from the code, wherein the configuration file stores user-supplied configuration information which allows the generated code to be configured after it is installed, and wherein the user-supplied information includes at least one of a resource type name, a vendor ID, an indication of whether the resource type is failover or scalable, an indication of whether the base application is network aware, and a selected language for the generated code; and
 i. automatically generating customized utility scripts, wherein the customized utility scripts enable starting, stopping, and removing an instance of the resource type on at least one node of said clustered computer system.

12. The computer readable medium of claim 11, wherein said application is a highly available application.

13. The computer readable medium of claim 11, wherein said application is a scalable application.

14. The computer readable medium of claim 11, wherein said resource type performs at least one of the following:
 a. starts execution of said application;
 b. stops execution of said application; and
 c. monitors execution of said application.

15. The computer readable medium of claim 11, wherein said code of said at least one resource type is a source code.

16. The computer readable medium of claim 11, wherein before said (c) said generated code of said resource type and said application are arranged into a software package.

17. The computer readable medium of claim 11, wherein said user specified characteristics comprise information on whether said resource type is failover or scalable.

18. The computer readable medium of claim 11, wherein said user specified characteristics comprise information on whether said application is type is network-aware or non network-aware.

19. The computer readable medium of claim 11, wherein said user interface is a graphical user interface.

20. The computer readable medium of claim 11, wherein said generating of said code further comprises providing said user with an ability to modify said generated code.

21. A computer system comprising at least a central processing unit and a memory, said memory storing a program for automatic generation of a resource type for an application, said resource type to be installed on one or more nodes of a clustered computer system, said program comprising:
  a. accepting user specified characteristics of said application and said clustered computer system using a user interface, wherein said application has multiple independent process trees;
  b. determining if said application can be wrapped in said resource type;
  c. receiving a user-supplied selection of a programming language;
  d. automatically generating a code in the user-supplied selected programming language for at least one resource type based at least on said input user specified characteristics;
  e. creating a file specifying, for each process tree of the multiple independent process trees, a command to start each process tree of the multiple process trees;
  f. wrapping said application in the at least one resource type;
  g. installing said generated code of said at least one resource type and said application on at least one node of said clustered computer system;
  h. automatically generating a configuration file separate from the code, wherein the configuration file stores user-supplied configuration information which allows the generated code to be configured after it is installed, and wherein the user-supplied information includes at least one of a resource type name, a vendor ID, an indication of whether the resource type is failover or scalable, an indication of whether the base application is network aware, and a selected language for the generated code; and
  i. automatically generating customized utility scripts, wherein the customized utility scripts enable starting, stopping, and removing an instance of the resource type on at least one node of said clustered computer system.

22. The computer system of claim 21, wherein said application is a highly available application.

23. The computer system of claim 21, wherein said application is a scalable application.

24. The computer system of claim 21, wherein said resource type performs at least one of the following:
  a. starts execution of said application;
  b. stops execution of said application; and
  c. monitors execution of said application.

25. The computer system of claim 21, wherein said code of said at least one resource type is a source code.

26. The computer system of claim 21, wherein before said (c) said generated code of said resource type and said application are arranged into a software package.

27. The computer system of claim 21, wherein said user specified characteristics comprise information on whether said resource type is failover or scalable.

28. The computer system of claim 21, wherein said user specified characteristics comprise information on whether said application is type is network-aware or non network-aware.

29. The computer system of claim 21, wherein said user interface is a graphical user interface.

30. The computer system of claim 21, wherein said generating of said code further comprises providing said user with an ability to modify said generated code.

* * * * *

UNITED STATES PATENT AND TRADEMARK OFFICE
CERTIFICATE OF CORRECTION

| | | |
|---|---|---|
| PATENT NO. | : 7,293,255 B2 | Page 1 of 1 |
| APPLICATION NO. | : 09/822164 | |
| DATED | : November 6, 2007 | |
| INVENTOR(S) | : Bjorn Dag Johnsen | |

It is certified that error appears in the above-identified patent and that said Letters Patent is hereby corrected as shown below:

On Title page Item (60) insert Related U.S. Application Data
Provisional application No. 60/235,064, filed on Sept. 25, 2000

Signed and Sealed this

Eighth Day of July, 2008

JON W. DUDAS
*Director of the United States Patent and Trademark Office*